Figure 1:
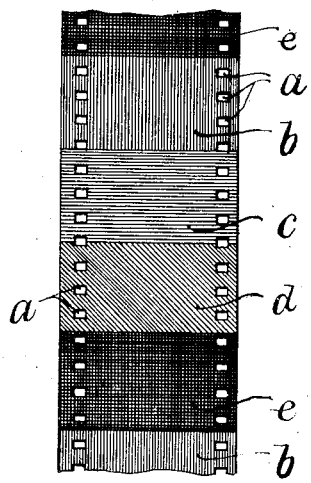

W. FRIESE-GREENE.
REPRODUCTION OF ANIMATED PICTURES.
APPLICATION FILED JULY 17, 1912.

1,155,056.

Patented Sept. 28, 1915.
2 SHEETS—SHEET 1.

WITNESSES
Fred White
René Bruine

INVENTOR
William Friese-Greene,
By his Attorneys
Fraser, Trask and Myers

UNITED STATES PATENT OFFICE.

WILLIAM FRIESE-GREENE, OF HOVE, BRIGHTON, ENGLAND, ASSIGNOR TO FRIESE-GREENE PATENTS, LIMITED, OF LONDON, ENGLAND.

REPRODUCTION OF ANIMATED PICTURES.

1,155,056.   Specification of Letters Patent.   Patented Sept. 28, 1915.

Application filed July 17, 1912. Serial No. 710,054.

*To all whom it may concern:*

Be it known that I, WILLIAM FRIESE-GREENE, a subject of the King of Great Britain and Ireland, and a resident of Hove, Brighton, Sussex, England, have invented certain new and useful Improvements in or Relating to the Reproduction of Animated Pictures, of which the following is a specification.

This invention relates to the reproduction of animated pictures, and its object is to provide a means whereby the natural shades and tones of color can be more nearly obtained on projection.

The invention relates to processes wherein the successive pictures are taken usually on an orthochromatic film, through the color divisions of a moving color filter or filters, positive transparencies being then prepared from the negative picture, and the positive transparencies being similarly projected with the aid of a moving color filter or filters. Such filters are usually arranged and operated so that the successive pictures are taken or projected through filters of different primary colors, for example, by employing band filters fed through the apparatus intermittently with the film, and divided up into sections or fields each of the length of a picture, or by applying the primary colors to the picture band itself, or by employing a disk filter rotating in the optical field.

In the taking and projection of cinematographic pictures in general, as is known, the film is fed through the optical field with an intermittent motion, the film being stationary during the exposures or projections, and being moved onward in the dark periods intervening between the successive exposures or projections. In the taking and projection of animated pictures with the aid of color filters, as above referred to, it has been proposed to make durations of the exposures or projections of different lengths for the different colors of the filters.

It has been found by the present inventor that a marked advance in reproducing the natural shades and tones of color with the aid of moving color filters, as above mentioned, can be obtained by providing between any two exposures or projections in a series of pictures a prolonged dark period of greater length of duration than the period occupied by any exposure or projection plus one of the other or normal dark intervals, but of less duration than twice the period occupied by any exposure or projection and a normal dark interval taken together. When the periods of exposure or projection are of different lengths of duration for different colors of the filter, then the prolonged dark interval will be of greater duration than the longest exposure or projection plus the dark interval immediately following such longest exposure or projection, but less than twice the longest exposure or projection plus the immediately following dark interval.

The object of the invention may be obtained in various ways. When using a band filter divided up into successive fields of primary colors, say, red, green and blue-violet, each of a picture length, the desired result can be obtained by interposing at any desired intervals a black or very dark-colored field of picture length. Thus, on moving the filter band through the camera or projecting lantern intermittently, simultaneously with and at the same rate as the film, the combined dark period represented by the presence in the optical field of the dark-colored section of film, taken together with normal dark periods which immediately precede and follow (travel of the film) will represent the dark period above specified, namely, it is greater than the duration of an exposure or projection plus a normal dark interval and less than twice such total duration. This prolonged dark interval may be interposed at any desired intervals of the succession of pictures. In cases where the filter band consists of a series of primary color fields, each of picture-length, for example, red, green and blue-violet, in regularly repeated sequence, the prolonged dark interval may with advantage be interposed after each set or series of primary colors by interposing a black or dark-colored field or filter section of picture-length after each series of primary color fields, but as before mentioned the dark period may be interposed at any desired points or intervals of the exposures or projections.

The object of the invention may likewise be attained with a positive transparency film, whereof the successive picture sections are colored alternately or otherwise with sets or series of primary colors, by interposing black or very dark picture sections at desired intervals. Such a film may, for example, consist of red, green and blue violet sections in regular repeated series and respectively bearing the successive pictures, with a black or very dark picture section interposed after each set of three color sections. By black or dark sections it will be understood that the whole surface of such section is of a black or very dark character.

In cases where a rotating screen is employed having color divisions or fields successively interposed in the optical field in the rotation of the screen during exposure or projection, the object of the invention may be attained by means of a uniformly rotating opaque circular disk, having transparent primary color filters, say red, green, and blue-violet, disposed at such angular distances apart as to provide intervening short and long opaque divisions, whereof the long opaque division is of greater circumferential length than the total circumferential length of a filter (or than the longest filter when the filters are of different lengths) plus the opaque division immediately following such filter, but is less than twice said total length. Such a filter may, for example, have segmental primary color filters disposed respectively at the initial portions of its first, second, and third quadrants, the opaque portions (normal dark periods) between the first and second filter and the second and third filter being about twice as long circumferentially as one of the filters, and the opaque portion of the third quadrant, taken together with the opaque fourth quadrant being greater circumferentially than the total length of a filter plus the opaque portion immediately following said filter, and being less than twice this total length. The screen will be rotated uniformly in the known way in synchronism with the movement of the film.

It will be understood that the invention is not confined to the use of three colors for the filters, but that two colors (say red and blue-violet) may be employed, or any other number of colors, provided that a prolonged dark period of the duration specified is interposed in the succession of exposures or projections. The prolonged dark interval of the present invention may with advantage be disposed between the red and the blue-violet filters. In some cases there may be employed for the prolonged dark period, blue, ruby, green or other color of a very dark character.

The colors of the screen need not necessarily follow each other in such manner that each picture is taken or projected through a different color. When it is desired, for instance, to accentuate a particular color in the pictures, or for other purpose, the colors of the screen may be so arranged that more than one picture is taken or projected through screen divisions of the same color, or the order of color divisions of the screen may be varied as required relatively to each other, the black or very dark screen or period being interposed at the required intervals corresponding to exposure or projection periods.

It has been found that by the means described, the natural tones and shapes of color can be more nearly obtained on projection than has hitherto been possible.

The accompanying drawings illustrate different embodiments of the invention as above explained.

Figure 2:
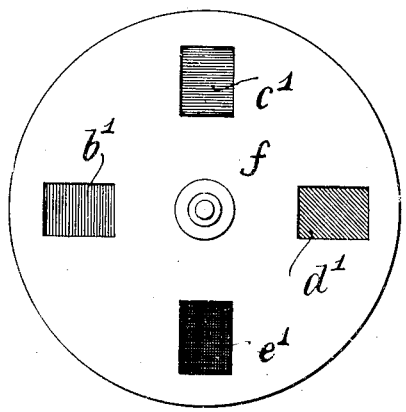
Figure 3:
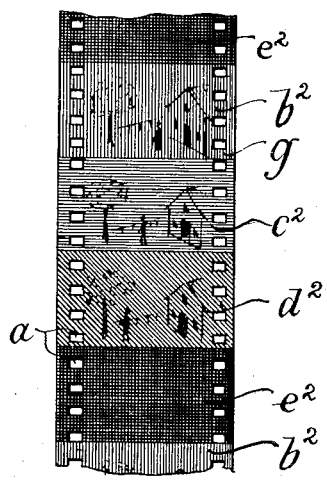
Figure 4:
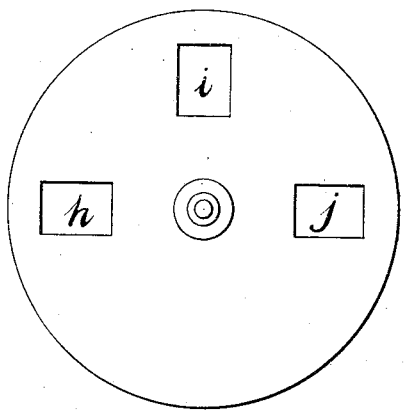
Figure 5:
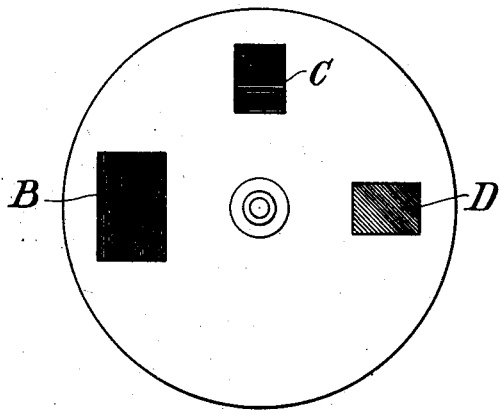

Figure 1 is a view of a portion of a band screen according to the invention; Fig. 2 is a diagrammatic view of a rotary screen; Fig. 3 is a view of a positive picture film according to the invention; Fig. 4 is a diagrammatic view of a shutter adapted for the purpose of the invention so as to give a black period in the projection of pictures through a color screen; and Fig. 5 is a view similar to Fig. 4, in which the exposures for different colors are for periods of different lengths.

The screen band Fig. 1 is made of celluloid or like transparent material provided with the usual marginal holes $a$ for driving, and it is divided up into sections of different colors, for example red ($b$), blue ($c$), and green ($d$), each of picture length. At intervals black sections $e$ are interposed. These may likewise be of picture length. They are shown as interposed at the ends of a set of red, blue and green sections, but they may be at other desired intervals.

In Fig. 2 the rotating screen disk $f$ is provided with red, blue and green screens $b'$, $c'$, $d'$, corresponding to successive pictures, while the fourth segment of the disk is full as shown at $e'$ so as to give the black period.

Referring to Fig. 3, $g$ is a positive picture film the picture sections of which are shown as colored alternately red ($b^2$) and blue ($c^2$) and green ($d^2$) with black sections ($e^2$) interposed at intervals.

Referring to Fig. 4 the rotating shutter disk has three windows $h\ i\ j$ at equal intervals, while the fourth segment of the shutter is full, so that the fourth picture is masked, the other three pictures being projected through the windows $h\ i\ j$.

With any of the arrangements illustrated, namely, the bands of Figs. 1 and 3 traveled intermittently in the usual way, or the rotary screen, Fig. 2, or the rotary shutter, Fig. 4, rotated uniformly in the usual way, the result will be to give a prolonged dark period of the duration specified and claimed.

What I claim is:—

1. A process for the reproduction of animated pictures in colors with the aid of moving color filters caused to pass successively through the optical field, said process comprising the provision between any two successive projections of a prolonged dark period of greater duration than the period occupied by a projection plus a normal dark interval, but of less duration than twice the period occupied by a projection and a normal dark interval taken together.

2. A process for the reproduction of animated pictures in colors with the aid of moving color filters caused to pass successively through the optical field, and wherein the periods of projection are of different lengths for different colors, said process comprising the provision between any two successive projections of a prolonged dark period of greater duration than the longest period of projection plus the dark interval immediately following such longest projection, but less than twice the longest period of projection plus the immediately following dark interval.

3. A process for the reproduction of animated pictures in colors with the aid of moving color filters caused to pass successively through the optical field, said process comprising the provision between any two successive exposures of a prolonged dark period of greater duration than the period occupied by an exposure plus a normal dark interval, but of less duration than twice the period occupied by an exposure and a normal dark interval taken together.

4. A process for the reproduction of animated pictures in colors with the aid of moving color filters caused to pass successively through the optical field, and wherein the periods of exposure are of different lengths for different colors, said process comprising the provision between any two successive exposures of a prolonged dark period of greater duration than the longest period of exposure plus the dark interval immediately following such longest exposure but less than twice the longest period of exposure plus the immediately following dark interval.

5. For projecting animated pictures in colors, a positive transparency film whereof the picture sections are colored alternately or otherwise with primary colors with dark sections of picture length interposed at intervals.

6. For use in the reproduction of animated pictures in colors, a uniformly rotatable screen having primary color filters with intervening short and long opaque divisions, the long opaque division being of greater circumferential length than the total circumferential length of a filter plus the opaque division immediately following said filter, and being less than twice said total circumferential length.

7. For use in the reproduction of animated pictures in colors a uniformly rotatable screen having primary color filters of different circumferential lengths, with intervening short and long opaque divisions, the long opaque division being of greater circumferential length than the total circumferential length of the longest filter plus the opaque division immediately following the latter, but being less than twice said total circumferential length.

In witness whereof, I have hereunto signed my name in the presence of two subscribing witnesses.

WILLIAM FRIESE-GREENE.

Witnesses:
    REGINALD EATON ELLIS,
    ROBERT MILTON SPEARPOINT.